US010066511B2

United States Patent
Heid et al.

(10) Patent No.: US 10,066,511 B2
(45) Date of Patent: Sep. 4, 2018

(54) SYSTEM AND METHOD FOR LOAD BALANCING OF INTERMITTENT RENEWABLE ENERGY FOR AN ELECTRICITY GRID

(71) Applicant: Siemens Aktiengesellschaft, Munich (DE)

(72) Inventors: Oliver Heid, Erlangen (DE); Paul Beasley, Abingdon (GB); Timothy Hughes, Wantage (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/315,476

(22) PCT Filed: Jun. 16, 2014

(86) PCT No.: PCT/EP2014/062584
§ 371 (c)(1),
(2) Date: Dec. 1, 2016

(87) PCT Pub. No.: WO2015/192877
PCT Pub. Date: Dec. 23, 2015

(65) Prior Publication Data
US 2017/0122129 A1 May 4, 2017

(51) Int. Cl.
*F01K 3/02* (2006.01)
*C01C 1/04* (2006.01)
(Continued)

(52) U.S. Cl.
CPC ............... *F01K 3/02* (2013.01); *C01B 3/025* (2013.01); *C01C 1/0417* (2013.01); *C25B 1/04* (2013.01);
(Continued)

(58) Field of Classification Search
CPC ..... C01C 1/0417; C01C 1/0405; C01B 3/025; C25B 1/04; H02P 9/04; F05B 2220/61; F01K 3/02; F03D 9/10; F03D 9/255
See application file for complete search history.

(56) References Cited

U.S. PATENT DOCUMENTS 6,906,432 B2   6/2005  Belokon et al.
2004/0253492 A1* 12/2004  Vajo ..................... H01M 8/1246
                                                        429/504
(Continued)

FOREIGN PATENT DOCUMENTS

CN       1388308 A      1/2003
CN     102477559 A      5/2012
(Continued)

OTHER PUBLICATIONS

International Search Report dated Nov. 6, 2014, for PCT application No. PCT/EP2014/062584.
(Continued)

*Primary Examiner* — Sean Gugger
(74) *Attorney, Agent, or Firm* — Beusse Wolter Sanks & Maire

(57) ABSTRACT

A system and method for load balancing of intermittent renewable energy for an electricity grid includes a production unit for producing Hydrogen and Nitrogen, a mixing unit to receive and mix the Hydrogen and the Nitrogen, an Ammonia source for receiving and processing the Hydrogen-Nitrogen mixture, an Ammonia power generator for generating energy for the energy grid, a Hydrogen injection system for extracting a Hydrogen portion from a stage of the system and for adding extracted Hydrogen to the gas stream to be provided to the Ammonia power generator, and a Hydrogen control system for controlling a flow rate of Hydrogen from the Hydrogen injection system to the gas stream to be provided to the Ammonia power generator, the
(Continued)

flow rate determined in accordance with a data set which contains information about actual working conditions of the Ammonia power generator and which is received by the Hydrogen control system.

23 Claims, 3 Drawing Sheets

(51) Int. Cl.
| | |
|---|---|
| C01B 3/02 | (2006.01) |
| C25B 1/04 | (2006.01) |
| F03D 9/10 | (2016.01) |
| F03D 9/25 | (2016.01) |
| F01K 25/10 | (2006.01) |
| H02K 7/18 | (2006.01) |
| H02P 9/04 | (2006.01) |

(52) U.S. Cl.
CPC .............. *F01K 25/106* (2013.01); *F03D 9/10* (2016.05); *F03D 9/255* (2017.02); *H02K 7/1807* (2013.01); *H02P 9/04* (2013.01); *F05B 2220/61* (2013.01)

(56) References Cited

U.S. PATENT DOCUMENTS

| | | | |
|---|---|---|---|
| 2007/0107432 A1* | 5/2007 | Smith | C01B 3/0005 60/673 |
| 2008/0102329 A1* | 5/2008 | Hollinger | H01M 16/003 429/418 |
| 2011/0286907 A1* | 11/2011 | Nakamura | C01B 3/025 423/359 |
| 2012/0068471 A1 | 3/2012 | Robertson | |
| 2013/0252120 A1* | 9/2013 | Robertson | H01M 8/0656 429/418 |
| 2013/0317959 A1 | 11/2013 | Joos et al. | |

FOREIGN PATENT DOCUMENTS

| | | |
|---|---|---|
| EP | 2377815 A1 | 10/2011 |
| RU | 2344304 C2 | 1/2009 |
| WO | 2008045456 A2 | 4/2008 |

OTHER PUBLICATIONS

IPRP (PCT/IPEA/416 and 409) dated Sep. 20, 2016, for PCT application No. PCT/EP2014/062584.

Leighty W, "Alaska Village Survival: Affordable Energy Independence via Renewables Firmed as Hydrogen Storage in Liquid Anhydrous Ammonia", NHA Conference and Hydrogen EXPO, Columbia, SC, pp. 1-11; URL: http://www.leightafoundation.org/files/09-NHA-ColumbiaSC-NH3-Rev16Mar-C.pdf; XP002691825.

Russian Federation office action dated Feb. 9, 2018, for RU patent application No. 2016149483.

CN search report dated Mar. 2, 2018, for CN patent application No. 201480079921.X.

* cited by examiner

SYSTEM AND METHOD FOR LOAD BALANCING OF INTERMITTENT RENEWABLE ENERGY FOR AN ELECTRICITY GRID

CROSS REFERENCE TO RELATED APPLICATIONS

This application is the US National Stage of International Application No. PCT/EP2014/062584 filed Jun. 16, 2014, and claims the benefit thereof, incorporated by reference herein in its entirety.

FIELD OF INVENTION

The invention relates to a system and method for load balancing of intermittent renewable energy for an electricity grid.

BACKGROUND OF INVENTION

The uptake of renewable natural resources (renewables) for energy generation in the last years has been impressive, but there is still the unsolved problem of dealing with the transient nature of the renewables. Both solar and wind power are intermittent by their nature and, therefore, it is not possible to provide a dependable baseload to the energy networks. Since the demand of energy consumers can be irregular, a power supply based on renewables does not match the demand of the consumers. Also, the excess energy, i.e. the amount of energy which would be momentarily available from renewables but which is not demanded by the consumers at that time, strains the energy networks and would get lost in case it is not consumed.

Thus, conditions exist in which the energy momentarily provided by renewables is not sufficient to cover the demand. However, there would also be conditions in which the energy momentarily provided by renewables is exceeding the current demand. As the proportion of energy from renewable sources increases, the situation will become unsustainable.

A promising approach for solving these drawbacks would be the use of long term energy buffers or storages which are suitable to store the energy. Such a solution would allow to handle situations in which the demand exceeds the available energy as well as situations in which excess energy is available.

A variety of buffering solutions for storing electrical energy are known, e.g. Lithium batteries and Vanadium based Redox batteries, but these solutions cannot provide the necessary scale of energy storage. Hydrogen offers another carbon free route for storing energy, but it is difficult and risky to utilize. In gaseous form it has to be compressed to 500 bars in order to achieve a suitable energy density. Liquid Hydrogen requires cryogenic temperatures and the associated complicated infrastructure. Moreover, the use of Hydrogen in either form requires safeguards due to the risk of explosion. For these reasons, Hydrogen is not considered to be a qualified candidate for energy storage.

Thus, there are currently no reliable and appropriate means for decoupling energy supply and demands for renewable energies on a local or national scale.

SUMMARY OF INVENTION

It is an object of the invention to provide a solution for supplying an energy grid with energy from an intermittent renewable energy source.

The object is solved by a system and a method according to the independent claims.

The invention is based on the approach of storing at least parts of the energy generated using renewable. This is achieved by using that energy to produce Hydrogen and Nitrogen. Hydrogen and Nitrogen are subsequently converted into Ammonia (NH3) which is a carbon-free fuel and which can be stored at ambient temperatures. Also, NH3 can be transported effectively and safely using pipelines, railroads, shipping and trucks. Moreover, NH3 offers the advantages that it can be synthesized in a carbon free process and it can be burned without generating green house gases.

The invention achieves a decoupling of the supply and demand of electricity from fluctuating renewable energy sources by using the renewable energy for the generation of Ammonia which can be stored subsequently. The stored Ammonia can then be used in a NH3 power generator to generate electricity which is fed into the electricity grid. This integrated solution proposed by the invention allows to translate intermittent electricity into a baseload provided by the renewable energy source to the local or national energy grid.

Further improvement is achieved by making use of the Hydrogen produced in the system, for example in the Hydrogen electrolyzer, at the temporary storage unit and/or at other suitable stages of the system, by mixing a portion of the produced Hydrogen with the NH3 which is conducted from the NH3 storage vessel to the NH3 power generator before the combustion. This results in better combustion properties such as a more efficient and cleaner burning process and reduced NOX exhaust. For this, the system comprises a Hydrogen injection system. The Hydrogen injection system extracts a Hydrogen portion from a suitable stage of the system and provides extracted Hydrogen to a mixer which is fluidly connected with the NH3 storage vessel and with the NH3 power generator. The mixer mixes the Hydrogen with NH3 from the storage vessel and provides an NH3-Hydrogen-mixture to the NH3 power generator.

Thus, the presence of the NH3 storage vessel as a buffer allows a better flexibility of providing energy to the energy grid and, therefore, an improved load balancing. Moreover, the efficiency of the system and method is improved by the Hydrogen injection system.

The invention can be applied for operating the energy network based on renewable energies as well as in the local energy supply for heavy industry and rural areas, grid stabilization.

In more detail, the system for providing energy for an energy grid and for load balancing of an energy input for the energy grid based on intermittent renewable energy provided by a renewable energy source, comprises—an H2-N2-production unit for producing Hydrogen and Nitrogen, wherein the H2-N2-production unit is operated by using energy provided by the renewable energy source, —a mixing unit configured to receive and mix the Hydrogen and the Nitrogen produced by the H2-N2-production unit to form a Hydrogen-Nitrogen-mixture, —an NH3 source for receiving and processing the Hydrogen-Nitrogen-mixture for generating a gas mixture containing NH3, wherein the NH3 source is fluidly connected to the mixing unit to receive the Hydrogen-Nitrogen mixture from the mixing unit and wherein the NH3 source is configured to generate the gas mixture containing NH3 from the Hydrogen-Nitrogen-mixture, wherein the NH3 source comprises an NH3 storage vessel for storing at least a part of the NH3 of the gas mixture containing NH3, —an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid, wherein the system further comprises—a Hydrogen injection system for extracting a Hydrogen portion from a stage of the system into the Hydrogen injection system and for adding extracted Hydrogen from the Hydrogen injection system to the gas stream to be provided to the NH3 power generator. to generate an NH3-Hydrogen-mixture prior to the NH3 stream reaching the NH3 power generator.

The system might comprise an NH3-Hydrogen-mixer, which is fluidly connected to the NH3 storage vessel, to the NH3 power generator, and to the Hydrogen injection system and which is configured and arranged to receive and mix NH3 from the NH3 storage vessel and Hydrogen from the Hydrogen injection system to form a NH3-Hydrogen-mixture to be provided to the NH3 power generator. The mixer allows to form a gas mixture prior to the combustion.

The Hydrogen injection system might comprise a Hydrogen extraction unit assigned to the stage of the system from which the Hydrogen portion is extracted, wherein the Hydrogen extraction unit enables a regulation of the portion of Hydrogen to be extracted at the stage to establish a particular flow of Hydrogen from the stage into the Hydrogen injection system, i.e. a regulation of the amount of Hydrogen to be extracted, i.e. a H2 flow rate regulation. With this setup, it becomes possible to extract particular amounts of Hydrogen from the selected stages by controlling the Hydrogen extraction units.

The Hydrogen injection system might comprise a plurality of devices for regulating a flow of Hydrogen in the Hydrogen injection system and to the gas stream to be provided to the NH3 power generator. Thus, a particular H2 flow rate into the mixer can be established by controlling one or more of the plurality of devices. The plurality of devices might comprise devices like pumps, valves etc. which allow a flow rate regulation.

The Hydrogen injection system might comprise a Hydrogen control system for controlling—a flow rate of Hydrogen from the stage at which the H2 portion is extracted into the Hydrogen injection system and/or—a flow rate of Hydrogen from the Hydrogen injection system to the gas stream to be provided to the NH3 power generator, i.e. to the NH3-H3-mixer. This is achieved by controlling the Hydrogen extraction units and/or the plurality of devices for regulating a flow of Hydrogen in the Hydrogen injection system. With this, optimal operation parameters can be established.

Therein, the controlling by the Hydrogen control system might be based on an input data set which contains information about actual working conditions in the NH3 power generator and wherein the working conditions include at least one of—a status of combustion in the combustion chamber, —a flow rate of NH3 from the NH3 storage vessel, —a temperature in the combustion chamber, —an actual chemical composition of a gas mixture in the combustion chamber, and/or—an actual chemical composition of combustion exhaust gases of the NH3 power generator. Thus, the H2 control system can establish optimum working conditions by considering a variety of parameters.

The H2-N2-production unit might comprise—a Hydrogen electrolyzer for producing the Hydrogen, wherein the Hydrogen electrolyzer is configured to receive water and energy produced by the renewable energy source and to produce the Hydrogen by electrolysis, and—an air separation unit for producing the Nitrogen, wherein the air separation unit is configured to receive air and energy produced by the renewable energy source and to produce the Nitrogen by separating the received air. This allows to produce Hydrogen H2 and Nitrogen N2 by utilizing energy from the renewable energy source, finally resulting in the ability to store that energy in form of NH3.

The stage at which the Hydrogen portion is extracted might be the Hydrogen electrolyzer.

The mixing unit might be fluidly connected to the H2-N2-production unit to receive the Hydrogen and Nitrogen produced therein, wherein the mixing unit might comprise a temporary storage system for receiving and buffering the Hydrogen and the Nitrogen from the H2-N2-production unit. The temporary storage system might be configured to receive the Hydrogen and the Nitrogen from the H2-N2-production unit, to temporary store the Hydrogen and the Nitrogen for buffering and to subsequently process the buffered Hydrogen and Nitrogen to the mixer. This allows a more efficient mixing process.

The stage at which the Hydrogen portion is extracted might be the temporary storage system.

The mixing unit might comprise—a mixer fluidly connected to the H2-N2-production unit for receiving the Hydrogen and the Nitrogen, i.e. mixer is fluidly connected to temporary storage system, and for mixing the received Hydrogen and Nitrogen to form a Hydrogen-Nitrogen-mixture and—a compressor for compressing the Hydrogen-Nitrogen-mixture from the mixer to form a compressed Hydrogen-Nitrogen-mixture to be directed to the NH3 source. Thus, the mixing unit provides a compressed H2-N2-mixture.

The NH3 source might comprise—an NH3 reaction chamber configured to receive the Hydrogen-Nitrogen-mixture from the mixing unit and to process the received Hydrogen-Nitrogen-mixture to form the gas mixture containing NH3 and—a separator for receiving the gas mixture containing NH3 from the NH3 reaction chamber, wherein—the separator is configured to separate NH3 from the gas mixture containing NH3 such that NH3 and a remaining Hydrogen-Nitrogen-mixture are produced and—the separator is fluidly connected to the NH3 storage vessel to direct the produced NH3 to the NH3 storage vessel.

The usage of the separator allows an efficient production of NH3.

In one embodiment, an additional a re-processing unit for re-processing the remaining Hydrogen-Nitrogen-mixture with a re-compressor and a second mixer is available, wherein—the re-compressor is fluidly connected to the separator to receive and compress the remaining Hydrogen-Nitrogen-mixture from the separator, —the second mixer is fluidly connected to the re-compressor to receive the compressed remaining Hydrogen-Nitrogen-mixture from the re-compressor, —the second mixer is fluidly connected to the mixing unit to receive the Hydrogen-Nitrogen-mixture from the mixing unit, and wherein—the second mixer is configured to mix the Hydrogen-Nitrogen-mixture from the mixing unit and the compressed remaining Hydrogen-Nitrogen-mixture from the re-compressor to form the Hydrogen-Nitrogen mixture to be provided to the NH3 source. The use of the re-processing unit allows to re-cycle remaining H2 and N2 to form further NH3.

In an alternative embodiment, the separator might be fluidly connected to the mixing unit to direct the remaining Hydrogen-Nitrogen-mixture from the separator to the mixing unit, such that the remaining Hydrogen-Nitrogen-mixture is mixed in the mixing unit with the Hydrogen and the Nitrogen from the H2-N2-production unit to form the Hydrogen-Nitrogen-mixture to be received by the NH3 source. This also allows to re-cycle remaining H2 and N2 to form further NH3.

The system might comprise further a main control unit for controlling the generation of the NH3 to be stored in the NH3 storage vessel and/or the generation of energy with the NH3 power generator.

For example, the controlling can be achieved by regulating the energy flow provided to the H2-N2-production unit and, therewith, the production of H2 and N2 or by regulating the mass flow in the system via influencing mixers, compressors or other components and/or by regulating the temperature in NH3 reaction chamber.

The main control unit might be configured and arranged, i.e. connected to corresponding components, such that the controlling of the generation of the NH3 to be stored in the NH3 storage vessel and/or the controlling of the generation of energy with the NH3 power generator at least depends on an actual power demand in the energy grid and/or on an amount of energy currently generated by the renewable energy source. This allows a flexible energy supply which reacts to actual demands in the energy grid and which on the other hand allows to store energy form the renewable energy source in case of low demands.

The main control unit might be configured—to preferably simultaneously reduce the generation of the NH3 to be stored in the NH3 storage vessel, which can be achieved by controlling the generation of the gas mixture containing NH3, and/or increase the generation of energy during periods of low renewable energy input from the renewable energy source, —to preferably simultaneously increase the generation of the NH3 to be stored in the NH3 storage vessel and/or reduce the generation of energy during periods of high renewable energy input from the renewable energy source.

This also allows effective load balancing of an energy input for the energy grid and a flexible energy supply which reacts to actual demands in the energy grid and which on the other hand allows to store energy form the renewable energy source in case of low demands.

Therein, the terms "low" and "high" can be referenced to certain given threshold values. I.e. a low renewable energy input means that the actual renewable energy input is less than a first threshold and a high renewable energy input means that the actual renewable energy input is more than a second threshold. First and second threshold can be identical or different from each other.

The system might further comprise an energy distribution unit which is configured to receive the energy provided by the renewable energy source and to distribute the energy to the energy grid and/or to the H2-N2-production unit, wherein the distribution depends on an energy demand situation in the energy grid. For example, in case of a higher energy demand from the energy grid, the fraction of energy provided by the renewable energy source to the energy grid is higher and the remaining fraction which is provided to the system is lower. In case of a lower energy demand from the energy grid, the fraction of energy provided by the renewable energy source to the energy grid is lower and the remaining fraction which is provided to the system is higher. This allows an effective operation of the system and, in the consequence, load balancing of an energy input for the energy grid.

In a corresponding method for providing energy for an energy grid and for load balancing of an energy input for the energy grid based on intermittent renewable energy provided by a renewable energy source, —at least a part of the energy from the renewable energy source is used to produce Hydrogen and Nitrogen a H2-N2-production unit, —the produced Hydrogen and Nitrogen are mixed in a mixing unit to form a Hydrogen-Nitrogen-mixture, —the Hydrogen-Nitrogen-mixture is processed in an NH3 source to generate a gas mixture containing NH3 and NH3 of the gas mixture containing NH3 is stored in a NH3 storage vessel, —a Hydrogen portion is extracted from a stage of the system into a Hydrogen injection system, —NH3 is provided from the NH3 storage vessel and mixed with Hydrogen from the Hydrogen injection system to form a NH3-Hydrogen-mixture, —the NH3-Hydrogen-mixture is provided to a combustion chamber of an NH3 power generator and the provided NH3-Hydrogen-mixture is combusted in the combustion chamber for generating the energy for the energy grid.

The Hydrogen control system might control—a flow rate of Hydrogen from the stage at which the H2 portion is extracted into the Hydrogen injection system by regulating a Hydrogen extraction unit assigned to the stage and/or—a flow rate of Hydrogen from the Hydrogen injection system to be mixed with the NH3 provided from the NH3 storage vessel by regulating a plurality of devices for regulating a flow of Hydrogen in the Hydrogen injection system and to the gas stream to be provided to the NH3 power generator. This is achieved by controlling the Hydrogen extraction units and/or the plurality of devices for regulating a flow of Hydrogen in the Hydrogen injection system.

The controlling by the Hydrogen control system might be based on an input data set which contains information about actual working conditions in the NH3 power generator and wherein the working conditions include at least one of—a status of combustion in the combustion chamber, —a flow rate of NH3 from the NH3 storage vessel, —a temperature in the combustion chamber, —an actual chemical composition of a gas mixture in the combustion chamber, and/or—an actual chemical composition of combustion exhaust gases of the NH3 power generator.

The gas mixture containing NH3 might be directed to a separator which separates NH3 from the gas mixture containing NH3 such that the NH3 to be stored in the NH3 storage vessel and a remaining Hydrogen-Nitrogen-mixture are produced.

The remaining Hydrogen-Nitrogen-mixture might be re-compressed and the re-compressed remaining Hydrogen-Nitrogen-mixture is mixed with the Hydrogen-Nitrogen-mixture mixture from the mixing unit to form the Hydrogen-Nitrogen-mixture to be received by the NH3 source.

The remaining Hydrogen-Nitrogen-mixture might be mixed in the mixing unit with the Hydrogen and the Nitrogen from the H2-N2-production unit to form the Hydrogen-Nitrogen-mixture to be received by the NH3 source.

A main control unit of the system might control the generation of the NH3 to be stored in the NH3 storage vessel and/or the generation of energy with the NH3 power generator.

The main control unit might control the generation of the NH3 to be stored in the NH3 storage vessel and/or the generation of energy with the NH3 power generator at least depending on an actual power demand in the energy grid and/or on an amount of energy currently generated by the renewable energy source.

The main control unit—preferably simultaneously reduces the generation of the NH3 to be stored in the NH3 storage vessel and/or increases the generation of energy during periods of low renewable energy input from the renewable energy source, —preferably simultaneously increases the generation of the NH3 to be stored in the NH3 storage vessel and/or reduces the generation of energy during periods of high renewable energy input from the renewable energy source.

A main control unit controls the generation of NH3 and the generation of energy. For example, during periods in which the renewable energy source generates less energy, for example and in the case of a windmill during phases of low wind, the main control unit would power up the NH3 power generator to supply more energy into the energy grid because the supply by the renewable energy source might not be sufficient. During periods of in which the renewable energy source generates a high amount of energy, for example during phases with strong wind, the main control unit would power down the NH3 power generator because the renewable energy source provides sufficient energy to the grid. However, the main control unit would increase the production and storage of NH3.

A device being "fluidly connected" to a further device means that a fluid can be transferred via a connection between the devices, e.g. a tube, from the device to the further device. Therein, a fluid can be gaseous as well as liquid.

BRIEF DESCRIPTION OF THE DRAWINGS

In the following, the invention is explained in detail on the basis of FIG. 1. Like reference numerals in different figures refer to the same components.

DETAILED DESCRIPTION OF INVENTION

Figure 1:
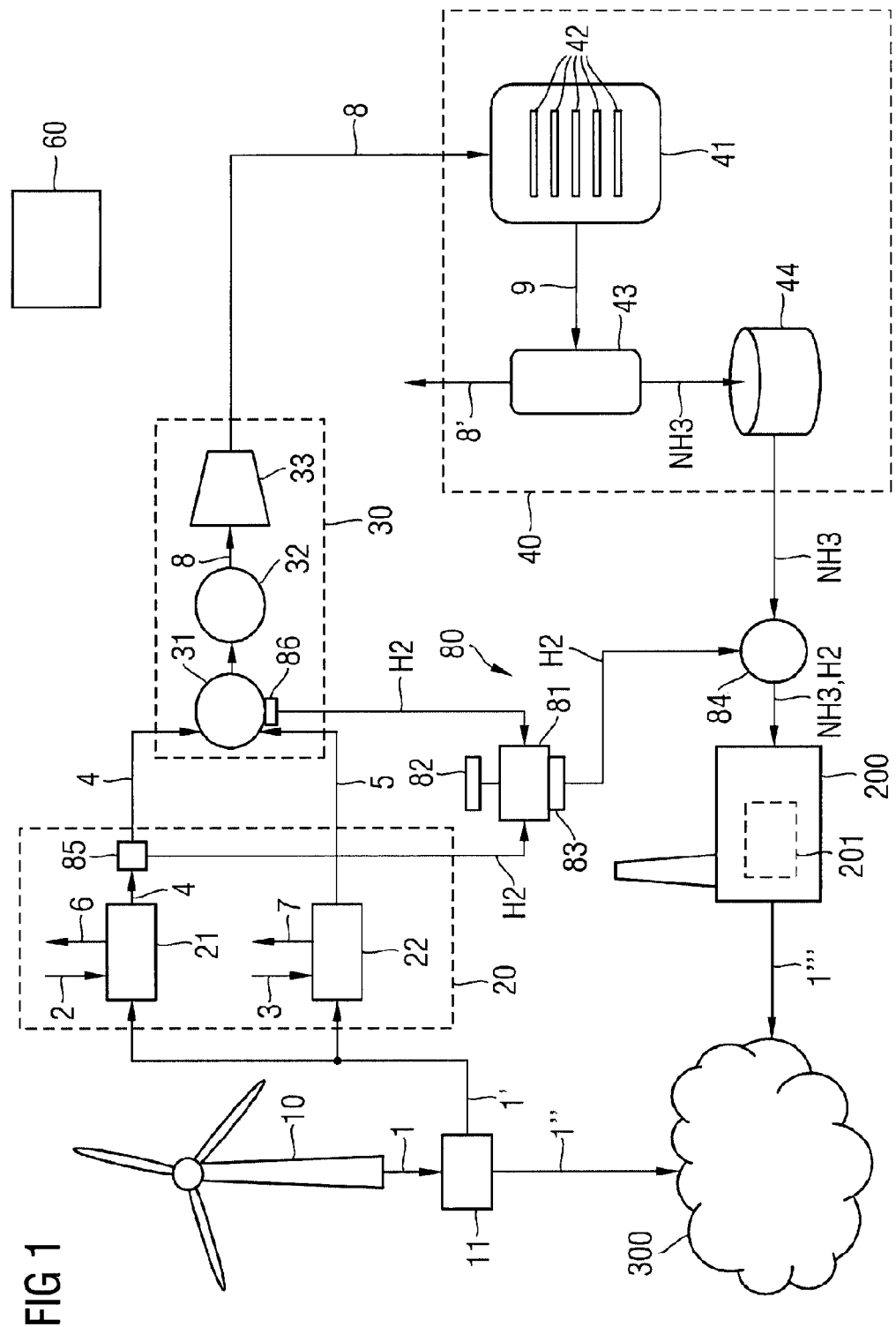
FIG. 1 shows a system for load balancing of an intermittent renewable energy source.

The system 100 shown in FIG. 1 comprises a renewable energy source 10, for example a windmill or a windfarm with a plurality of individual windmills. Alternatively, the renewable energy source 10 can also be a solar power plant or any other power plant which is suitable for generating energy out of a renewable feedstock like water, wind, or solar energy. In the following, the system 100 is explained under the assumption that the renewable energy source 10 is a windmill. However, this should not have any limiting effect on the invention.

The windmill 10 is connected to an energy grid 300 to supply energy generated by the windmill 10 to the grid 300. Therein, an energy amount 1" which is at least a fraction of the energy 1 generated by the windmill 10 is provided to the energy grid 300 to meet the energy demands of the consumers in the energy grid 300. It might be mentioned that the energy grid 300 would normally also have access to other energy sources.

However, a remaining energy amount 1' of the generated energy 1 can be used in the system 100 to operate an Hydrogen-Nitrogen-production unit 20 (H2-N2-production unit) of the system 100.

Especially when excess energy is available, i.e. when the energy 1 generated by the renewable energy source 10 is exceeding the energy demand of the energy grid 300 to the renewable energy source 10, this excess energy can be directed to the H2-N2-production unit 20 to operate the unit 20. The amount of energy 1' which is fed to the H2-N2-production unit 20 depends on the energy demands of consumers to be supplied by the energy grid 300. I.e. in case of high demands, e.g. during peak times, it might be necessary that 100% of the energy 1 generated by the windmill 10 has to be fed into the electricity grid 300 to cover the demand. In contrast, in case of very low demands, e.g. during night times, 100% of the electricity 1 generated by the windmill 10 might be available for use in the system 100 and can be directed to the H2-N2-production unit 20.

Such managing and distribution of energy 1 from the windmill 10 is achieved by an energy distribution unit 11. The energy distribution unit 11 receives the energy 1 from the windmill 10. As indicated above, certain ratios of the energy 1 are directed to the energy grid 300 and/or to the system 100 and the H2-N2-production unit 20, respectively, depending on the energy demand situation in the energy grid 300. Thus, the energy distribution unit 11 is configured to receive the energy 1 provided by the renewable energy source 10 and to distribute the energy 1 to the energy grid 300 and/or to the H2-N2-production unit 20, wherein the distribution depends on an energy demand situation in the energy grid 300.

For example, in case a high amount of energy is demanded in the grid 300, most or all of the energy 1 would be directed to the grid 300 and only less energy 1' would be provided to the H2-N2-production unit 20. In case the demand situation is such that only less energy is demanded in the grid 300, most or all of the energy 1 provided by the renewable energy source 10 can be used for generation of NH3. Thus, a high amount of energy 1' would be provided to the H2-N2-production unit 20.

As mentioned above, the amount 1' of the energy 1 generated by the renewable energy source 10 is supplied to the system 100 and to the H2-N2-production unit 20 to achieve the production of NH3. The H2-N2-production unit 20 comprises a Hydrogen electrolyzer 21 and an air separation unit 22.

The Hydrogen electrolyzer 21 of the H2-N2-production unit 20 is used to generate Hydrogen 4 and Oxygen 6 through the electrolysis of water 2. The Hydrogen electrolyzer 21 is supplied with water 2 from an arbitrary source (not shown) and it is operated using energy 1' from the windmill 10. Oxygen 6 is a byproduct of the electrolyzer 21 and it can be vented and released into the ambient air.

The air separation unit (ASU) 22 of the H2-N2-production unit 20 is used for the generation of Nitrogen 5. Energy 1' provided by the windmill 10 is used to operate the ASU 22 which utilizes conventional air separation techniques to separate Nitrogen 5 from air 3. The remaining components of the air 3, i.e. Oxygen and others, can be released into the ambient air.

Thus, the windmill 10 is utilized to provide the energy 1' for both the electrolysis of water 2 to form Hydrogen 4 with the Hydrogen electrolyzer 21 and for separating Nitrogen 5 from air 3 using the ASU 22.

Both Hydrogen 4 and Nitrogen 5 are then directed to a mixing unit 30 of the system 100. The mixing unit 30 comprises a temporary storage unit 31, a mixer 32 and a compressor 33. First, Hydrogen 4 and Nitrogen 5 pass the temporary storage unit 31 before being mixed in the mixer 32. The resulting Hydrogen-Nitrogen-gas mixture 8 (H2-N2-gas mixture) is subsequently compressed to fifty or more atmospheres in the compressor 33.

Ammonia NH3 can now be formed by processing the compressed H2-N2-gas mixture 8 in the presence of a catalyst at an elevated temperature. This is achieved in a NH3 reaction chamber 41 of an NH3 source 40 of the system 100. The compressed H2-N2-gas mixture 8 from the mixing unit 30 and from the compressor 33, respectively, is directed to the NH3 reaction chamber 41. The reaction chamber 41 comprises one or more NH3 reaction beds 42 which are operated at an elevated temperature of, for example, 350-450° C. The NH3 reaction chamber 41 produces a mixture of NH3 and, additionally, Nitrogen N2 and Hydrogen H2 out of the H2-N2-gas mixture from the mixer 30, i.e. the NH3 reaction chamber releases an NH3-H2-N2-gas mixture 9.

For example, a suitable catalyst can be based on iron promoted with K2O, CaO, SiO2, and Al2O3 or, rather than the iron based catalyst, ruthenium.

The NH3-H2-N2-mixture 9 is directed to a separator 43 of the NH3 source 40, for example a condenser, where NH3 is separated from the NH3-H2-N2-mixture 9. Thus, the separator 43 produces NH3, which is sent to an NH3 storage vessel 44 of the NH3 source 40, and a remaining H2-N2-gas mixture 8'.

It can be assumed that an extensive knowledge base exists both on the storage and on the transportation of Ammonia. The same is applicable for the handling and transportation of Hydrogen, Nitrogen and Hydrogen-Nitrogen-mixtures. Therefore, the NH3 storage vessel 44 as well as the variety of ducts which connect all the components of the system 100 for directing NH3 and other gases or gas mixtures are not described in detail.

As explained above, the separator 43 generates NH3 out of the NH3-H2-N2-mixture 9 provided by the NH3 reaction chamber 41 and a H2-N2-gas mixture 8' remains. In one embodiment of the invention, for which two variations are shown in FIGS. 2 and 3, this remaining H2-N2-gas mixture 8' is re-cycled to be utilized again for the generation of NH3 in the NH3 reaction chamber 41.

Figure 2:
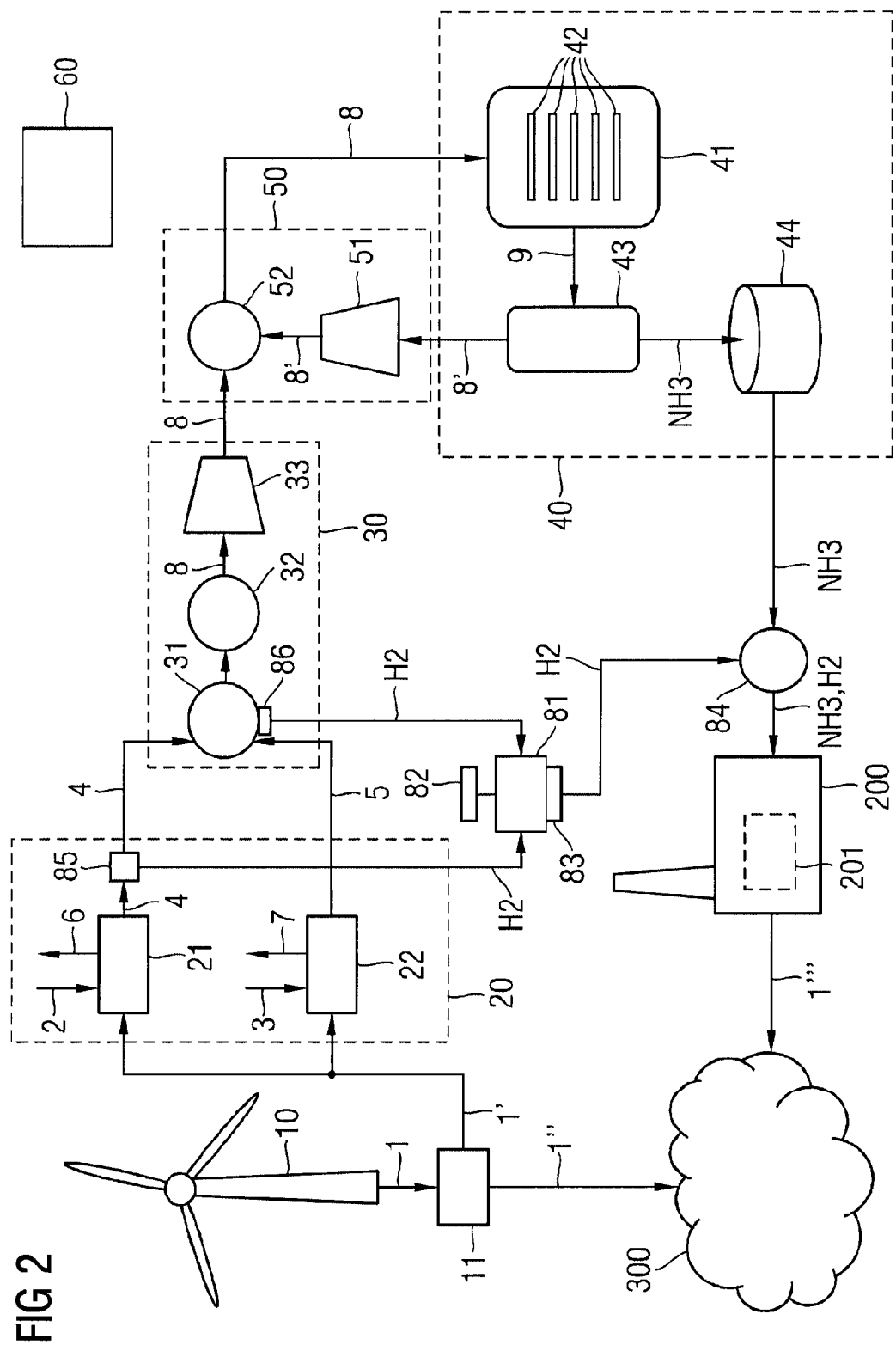
FIG. 2 shows a further embodiment of the system with a re-cycling of a remaining H2-N2-gas mixture.

For this, the system 100 of this embodiment as shown in FIG. 2 comprises an additional re-processing unit 50 with a re-compressor 51 and a mixer 52. Moreover, this embodiment of the invention differs from the above described basic embodiment of the invention in that the compressed H2-N2-gas mixture 8 from the compressor 33 is not passed directly to the NH3 reaction chamber 41, but it reaches the NH3 reaction chamber 41 only via the mixer 52 of the re-processing unit 50. The remaining H2-N2-gas mixture 8' of the separator 43 is passed to the re-compressor 51 of the re-processing unit 50 of the system 100. Like the compressor 33, the re-compressor 51 compresses the remaining H2-N2-gas mixture 8' to fifty or more atmospheres to account for pressure losses during the processing in the NH3 reaction chamber 41 and in the separator 43. The re-compressed remaining H2-N2-gas mixture 8' is then passed to the mixer 52 where it is mixed with the fresh H2-N2-gas mixture 8 from the mixer 30 and the compressor 33, respectively. The mixer 52 generates a mixture 8 of the H2-N2-gas mixtures 8, 8' which is subsequently directed to the NH3 reaction chamber 41. In the following, the gas mixture is processed as described above in the NH3 source 40 to produce NH3 and, again, a remaining H2-N2-gas mixture 8'.

Figure 3:
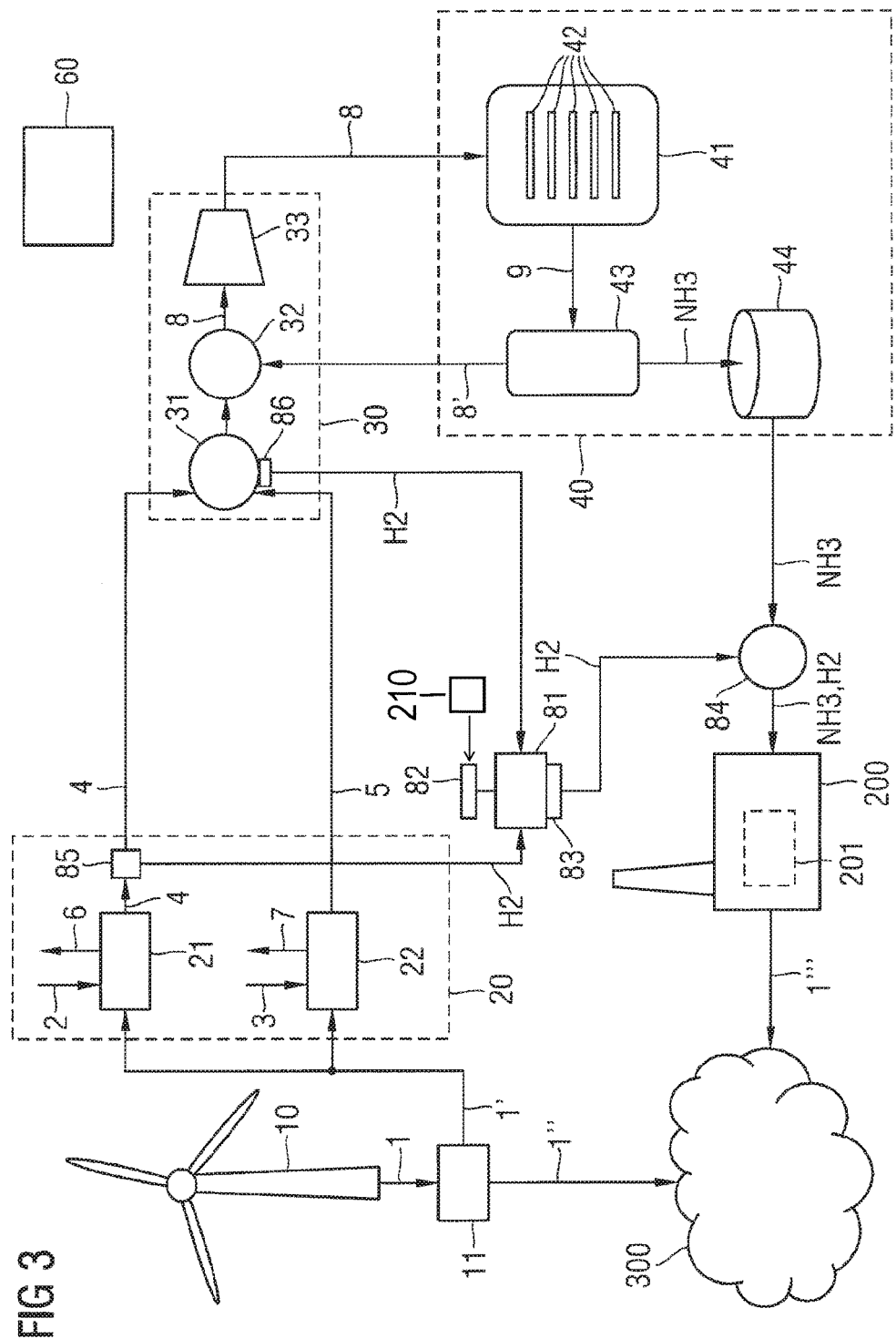
FIG. 3 shows a variation of the further embodiment of the system.

FIG. 3 shows a variation of the embodiment shown in FIG. 2. The remaining H2-N2-gas mixture 8' is directly fed into the mixer 32 of the mixing unit 30 to be mixed with the incoming Hydrogen and Nitrogen from the temporary storage unit 31. A separate re-processing unit 50 is not used.

In the following, reference is made again to FIG. 1. However, the details and features described below are also applicable for the embodiments and variations shown in FIGS. 2 and 3.

The NH3 storage vessel 44 is fluidly connected with an NH3 power generator 200 such that an NH3 gas stream can be established to transport NH3 from the storage vessel 44 to the NH3 power generator 200. Ammonia can be used in a number of different combustion cycles, for example in the Brayton cycle or in the Diesel cycle. However, at a power level of a windmill or a windfarm, it would be appropriate to use a gas turbine for combustion of Ammonia for the generation of electrical energy, wherein the Brayton cycle would be applicable for a gas turbine solution. Thus, the NH3 power generator 200 can be a gas turbine which is configured for the combustion of Ammonia. It has been shown earlier that conventional gas turbines with only slight modifications of the burner would be suitable.

The gas turbine 200 combusts the NH3 from the NH3 storage vessel 44 for the generation of energy 1''' in a combustion chamber 201 of the NH3 power generator 200 and gas turbine, respectively. This energy 1''' can then be fed into the energy grid 300.

However, the performance and efficiency of the NH3 power generator 200 and the gas turbine, respectively, can be optimized by introducing additional Hydrogen H2 into the NH3 gas stream from the NH3 storage vessel 44 prior to the combustion in the combustion chamber 201. The presence of additional Hydrogen H2 in the resulting NH3-H2-gas mixture to be burned in the combustion chamber 201 results in improved combustion properties, for example in an increased efficiency and improved cleanliness of the burning process in the combustion chamber 201 as well as in an reduced NOX exhaust.

Therefore, the system 100 comprises a Hydrogen injection system 80 for providing Hydrogen H2 to be added to the NH3 gas stream from the NH3 storage vessel 44. The Hydrogen injection system 80 may receive Hydrogen H2 from a variety of stages of the system 100. For example, the Hydrogen H2 to be injected into the NH3 stream might be a portion of the Hydrogen 4 produced in the Hydrogen electrolyzer 21 and/or it might be a portion of the Hydrogen available in the temporary storage unit 31 of the mixing unit 30. Other suitable stages to provide Hydrogen H2 would be, for example, the mixer 32, the compressor 33, the NH3 reaction chamber 41, and/or the separator 43. However, the most suitable stages would be the Hydrogen electrolyzer 21 and the temporary storage unit 31 because at those stages the Hydrogen H2 would not have to be separated from another gas like Nitrogen N2, since at those stages Hydrogen is not a component of a gas mixture. In any case, only a portion <<100% of the total amount of Hydrogen at the respective stage would be available for the Hydrogen injection system 80. For example, the portion might be 10% of the total amount of Hydrogen available at that stage.

The Hydrogen injection system 80 comprises a mixer 84 which is arranged between the NH3 storage vessel 4 and the NH3 power generator 200 such that NH3 from the storage vessel 44 is first directed into the mixer 84 before reaching the NH3 power generator 200. In the mixer 84, the NH3 is mixed with the Hydrogen H2 coming from the Hydrogen injection system 80.

The Hydrogen injection system 80 moreover comprises at every stage 21, 31 a Hydrogen extraction unit 85, 86 which enables the regulation of the portion of Hydrogen to be extracted at that stage. The extraction units 85, 86 are controlled by a Hydrogen control system 82 and might comprise valves and/or pumps which are controlled to establish a particular flow of Hydrogen H2 into the Hydrogen injection system 80.

The extracted Hydrogen H2 is directed to and stored in a Hydrogen storage 81. However, the storage 81 is optional and the extracted Hydrogen H2 might be directed to the mixer 84 without being stored in between.

A flow rate of Hydrogen H2 from the stage 21, 31 at which the H2 portion is extracted is managed by the Hydrogen control system 82. The Hydrogen control system 82 controls the Hydrogen extraction units 85, 86 and/or an additional plurality of devices 83 like pumps, valves and/or other devices suitable for controlling a flow rate in the Hydrogen injection system 80. With this setup, it becomes possible to extract particular amounts of Hydrogen from the selected stages 21, 31 by controlling the Hydrogen extraction units 85, 86. Also, a particular H2 flow rate into the mixer 84 can be established by controlling the plurality of devices 83. Both is achieved by the Hydrogen control system 82.

For this, the Hydrogen control system 82 receives as an input a data set 210 which contains information about actual working conditions of the NH3 power generator 200. These working conditions may include a status of combustion in an combustion chamber 201 of the NH3 power generator 200 and/or the amount of NH3 reaching the mixer 84 from the NH3 storage vessel 44, i.e. the NH3 flow rate to the mixer 84. Moreover, other combustion parameters which allow conclusions about working conditions in the NH3 power generator can also be included in the data set, for example a temperature and/or an actual chemical composition of the gas in the combustion chamber 201 and/or the chemical composition of combustion exhaust gases of the NH3 power generator 200. Out of these and potentially other data, the Hydrogen control system 82 determines and establishes the optimum flow rate of Hydrogen H2 to be provided to the mixer 84 by controlling the H2 extraction units 85, 86 and/or the plurality of devices 83. For example, the data might be determined with corresponding sensors (not shown) and sensor data might be transferred to the Hydrogen control system 82 wirelessly.

The system 100 moreover comprises a main control unit 60 which is configured to control various components of the system 100 (connections of the main control unit 60 with other components of the system 100 are not shown in FIG. 1 to avoid confusion). Especially, the main control unit 60 controls the process of generating energy 1''' for the energy grid 300 and the production of NH3.

In case the energy supply from the windmill 10 and the energy managing unit 11, respectively, to the system 100 is too low, for example due to high energy demands in the energy grid 300, the main control unit 60 reduces the production of NH3 by reducing the gas mass flow in the system 100 by powering down the compressors 33, 51 and/or the H2-N2-production unit 20 with the electrolyzer 21 and the ASU 22. Thus, less energy 1' is directed from the windmill 10 to the system 100 and more energy 1'' is available for the energy grid 300. Moreover, the main control unit 60 increases the NH3 mass flow from the NH3 storage vessel 44 to the NH3 power generator 200. Consequently, the NH3 power generator 200 increases the generation of energy 1''' required for the energy grid 300 in order to guarantee a stable energy supply in the grid 300 to achieve a balanced load.

In case the energy supply from the windmill 10 and the electricity managing unit 11, respectively, to the system 100 is too high, for example when the windmill 10 generates more energy than required by the energy grid 300, the main control unit 60 intensifies the production of NH3 in the system 100 by increasing the gas mass flow in the system 100 by providing more power to the compressors 33, 51, to the electrolyzer 21 and/or to the ASU 22. This results in an increased production of NH3 which is stored in the NH3 storage vessel 44. However, the generation of energy 1''' from the NH3 power generator 200 for the energy grid 300 is not increased, but it might be decreased.

Moreover, the main control unit 60 controls the generation of power in the NH3 power generator 200 based on the energy consumption and demand in the electricity grid 300 and based on the available power supply by any energy sources available for the grid 300. Thus, in case the available power supply in the grid 300 is less than the demand, the main control unit 60 would power up the NH3 power generator 200 to cover the demand. In case the available power supply in the grid 300 is higher than the demand, the main control unit 60 would power down the NH3 power generator 200 and the NH3 generation would be intensified by supplying more energy to the H2-N2-production unit 20 and by increasing the mass flow in the system 100 so that the NH3 storage vessel 44 can be filled up again.

In other words, the main control unit 60 is configured to reduce the generation of NH3 to be directed to the NH3 storage vessel 44 and/or increase the generation of energy 1''' during periods of too low renewable energy input 1, e.g. during periods of low wind and/or high energy demands in the energy grid 300. Also, the main control unit 60 is configured to increase the generation of NH3 to be directed to the NH3 storage vessel 44 and/or reduce the generation of energy 1''' during periods of too high renewable energy input 1, e.g. during periods of strong winds and/or low energy demands in the grid 300.

Thus, the controlling performed by the main control unit 60 may depend on the actual power demand in the energy grid 300, the energy 1 generated by the renewable energy source 10, and/or the actual amount of energy 1' from the renewable energy source 10 available for the system 100.

Correspondingly, the main control unit 60 has to be connected to the energy grid 300 to receive information about the current energy demand and coverage in the grid 300. Moreover, the main control unit 60 would be connected to the energy distribution unit 11 and/or to the windmill 10 directly to receive information about energy 1, 1', 1'' provided by the windmill 10 and available for usage in the system 100 and in the grid 300. The main control unit 60 would have to be connected to the H2-N2-production unit 20 to control the amount of produced Hydrogen and Nitrogen and to the various mixers and compressors, if applicable, to regulate the mass flow in the system. With this, the main control unit 60 can regulate the production of NH3 to be directed to the NH3 storage vessel 44. In addition to this, the main control unit 60 is connected to the NH3 storage vessel 44 to regulate the supply of NH3 to the NH3 power generator 200 and to the NH3 power generator 200 itself to regulate the energy generation by NH3 combustion. Finally, the main control unit 60 can be connected to the Hydrogen control system 82 such that the Hydrogen H2 flow rate from the stages 21, 31 into the Hydrogen injection system 80 and/or the Hydrogen flow rate from the Hydrogen injection system 80 to the mixer 84 can also be influenced centrally by the main control unit 60.

The invention claimed is:

1. A system for providing energy for an energy grid based on energy provided by a renewable energy source, comprising
an H2-N2-production unit for producing Hydrogen and Nitrogen, wherein the H2-N2-production unit is operated by using the energy provided by the renewable energy source, a mixing unit configured to receive and mix the Hydrogen and the Nitrogen produced by the H2-N2-production unit to form a Hydrogen-Nitrogen-mixture, an ammonia (NH3) source for receiving and processing the Hydrogen-Nitrogen-mixture for generating a gas mixture containing NH3, wherein the NH3 source comprises an NH3 storage vessel for storing at least a part of the NH3 of the gas mixture containing NH3, an NH3 power generator for generating the energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid, a Hydrogen injection system (HIS) for extracting a Hydrogen portion from a stage of the system and for adding extracted Hydrogen to the gas stream to be provided to the NH3 power generator, wherein the Hydrogen injection system comprises a Hydrogen control system for controlling an HIS flow rate of Hydrogen from the Hydrogen injection system to the gas stream to be provided to the NH3 power generator, the HIS flow rate being determined in accordance with a data set which contains information about actual working conditions of the NH3 power generator, wherein the data set is received by the Hydrogen control system, wherein the mixing unit is fluidly connected to the H2-N2-production unit to receive the Hydrogen and the Nitrogen produced therein, wherein the mixing unit comprises a temporary storage system for receiving and buffering the Hydrogen and the Nitrogen from the H2-N2-production unit, and wherein the stage at which the Hydrogen portion is extracted is the temporary storage system.

2. The system according to claim 1,
wherein the Hydrogen control system is further for controlling a stage flow rate of Hydrogen from the stage at which the Hydrogen portion is extracted into the Hydrogen injection system.

3. The system according to claim 1,
wherein the controlling by the Hydrogen control system is based on the data set, and wherein the working conditions include at least one of:
a status of combustion in the combustion chamber,
an NH3 flow rate of NH3 from the NH3 storage vessel,
a temperature in the combustion chamber,
an actual chemical composition of a gas mixture in the combustion chamber, and/or
an actual chemical composition of combustion exhaust gases of the NH3 power generator.

4. The system according to claim 1, further comprising:
an NH3-Hydrogen-mixer fluidly connected to the NH3 storage vessel, to the NH3 power generator, and to the Hydrogen injection system and which is configured and arranged to receive and mix NH3 from the NH3 storage vessel and Hydrogen from the Hydrogen injection system to form a NH3-Hydrogen-mixture to be provided to the NH3 power generator.

5. The system according to claim 1,
wherein the Hydrogen injection system comprises a Hydrogen extraction unit assigned to the stage of the system from which the Hydrogen portion is extracted, wherein the Hydrogen extraction unit enables a regulation of the portion of Hydrogen to be extracted at the stage.

6. The system according to claim 1,
wherein the Hydrogen injection system comprises a plurality of devices for regulating a flow of Hydrogen in the Hydrogen injection system and to the gas stream to be provided to the NH3 power generator.

7. The system according to claim 1,
wherein the H2-N2-production unit comprises
a Hydrogen electrolyzer for producing the Hydrogen, wherein the Hydrogen electrolyzer is configured to receive water and energy produced by the renewable energy source and to produce the Hydrogen by electrolysis, and
an air separation unit for producing the Nitrogen, wherein the air separation unit is configured to receive air and energy produced by the renewable energy source and to produce the Nitrogen by separating the received air.

8. The system according to claim 7,
wherein the stage at which the Hydrogen portion is extracted is the Hydrogen electrolyzer.

9. The system according to claim 1,
wherein the mixing unit comprises:
a mixer fluidly connected to the H2-N2-production unit for receiving the Hydrogen and the Nitrogen and for mixing the received Hydrogen and Nitrogen to form the Hydrogen-Nitrogen-mixture, and
a compressor for compressing the Hydrogen-Nitrogen-mixture from the mixer to form a compressed Hydrogen-Nitrogen-mixture to be directed to the NH3 source.

10. The system according to claim 1,
wherein the NH3 source comprises
an NH3 reaction chamber configured to receive the Hydrogen-Nitrogen-mixture from the mixing unit and to process the received Hydrogen-Nitrogen-mixture to form the gas mixture containing NH3 and
a separator for receiving the gas mixture containing NH3 from the NH3 reaction chamber,
wherein the separator is configured to separate NH3 from the gas mixture containing NH3 such that NH3 and a remaining Hydrogen-Nitrogen-mixture are produced, and
wherein the separator is fluidly connected to the NH3 storage vessel to direct the produced NH3 to the NH3 storage vessel.

11. The system according to claim 10,
wherein the separator is fluidly connected to the mixing unit to direct the remaining Hydrogen-Nitrogen-mixture from the separator to the mixing unit, such that the remaining Hydrogen-Nitrogen-mixture is mixed in the mixing unit with the Hydrogen and the Nitrogen from the H2-N2-production unit to form the Hydrogen-Nitrogen-mixture to be received by the NH3 source.

12. The system according to claim 1, further comprising:
a main control unit for controlling the generation of the NH3 to be stored in the NH3 storage vessel and/or the generation of energy with the NH3 power generator.

13. The system according to claim 12,
wherein the main control unit is configured and arranged such that the controlling of the generation of the NH3 to be stored in the NH3 storage vessel and/or of the generation of energy with the NH3 power generator depends on an actual power demand in the energy grid and/or on an amount of energy currently generated by the renewable energy source.

14. The system according to claim 12, wherein the main control unit is configured to
reduce the generation of the NH3 to be stored in the NH3 storage vessel and/or increase the generation of energy during periods of low renewable energy input from the renewable energy source, and
increase the generation of the NH3 to be stored in the NH3 storage vessel and/or reduce the generation of energy during periods of high renewable energy input from the renewable energy source.

15. The system according to claim 1, further comprising an energy distribution unit which is configured to receive the energy provided by the renewable energy source and to distribute the energy to the energy grid and/or to the H2-N2-production unit, wherein the energy distribution depends on an energy demand situation in the energy grid.

16. A method for providing energy for an energy grid based on energy provided by a renewable energy source, the method comprising:
using at least a part of the energy from the renewable energy source to produce Hydrogen and Nitrogen a H2-N2-production unit, wherein the H2-N2 production unit is part of a system for providing the energy for the energy grid based on the energy provided by the renewable energy source,
mixing the produced Hydrogen and Nitrogen in a mixing unit to form a Hydrogen-Nitrogen-mixture,
processing the Hydrogen-Nitrogen-mixture in an ammonia (NH3) source to generate a gas mixture containing NH3 and storing NH3 of the gas mixture containing NH3 in a NH3 storage vessel,
extracting a Hydrogen portion from a stage of the system into a Hydrogen injection system,
providing NH3 from the NH3 storage vessel and mixing NH3 with Hydrogen from the Hydrogen injection system to form a NH3-Hydrogen-mixture,
providing the NH3-Hydrogen-mixture to a combustion chamber of an NH3 power generator and combusting the provided NH3-Hydrogen-mixture in the combustion chamber for generating the energy for the energy grid, and
controlling by a Hydrogen control system a Hydrogen injection system (HIS) flow rate of Hydrogen from the Hydrogen injection system to be mixed with the NH3 provided from the NH3 storage vessel, the HIS flow rate determined by the Hydrogen control system in accordance with a data set which contains information about actual working conditions of the NH3 power generator, wherein the data set is received by the Hydrogen control system,
wherein the gas mixture containing NH3 is directed to a separator which separates NH3 from the gas mixture containing NH3 such that the NH3 to be stored in the NH3 storage vessel and a remaining Hydrogen-Nitrogen-mixture are produced, and
wherein the remaining Hydrogen-Nitrogen-mixture is re-compressed and the re-compressed remaining Hydrogen-Nitrogen-mixture is mixed with the Hydrogen-Nitrogen-mixture from the mixing unit to form the Hydrogen-Nitrogen-mixture to be received by the NH3 source.

17. The method according to claim 16, wherein the Hydrogen control system further controls a stage flow rate of Hydrogen from the stage at which the hydrogen portion is extracted into the Hydrogen injection system.

18. The method according to claim 16, wherein the controlling by the Hydrogen control system is based on the data set, and wherein the working conditions include at least one of:
a status of combustion in the combustion chamber,
an NH3 flow rate of NH3 from the NH3 storage vessel,
a temperature in the combustion chamber,
an actual chemical composition of a gas mixture in the combustion chamber, and/or
an actual chemical composition of combustion exhaust gases of the NH3 power generator.

19. The method according to claim 16, wherein the remaining Hydrogen-Nitrogen-mixture is mixed in the mixing unit with the Hydrogen and the Nitrogen from the H2-N2-production unit to form the Hydrogen-Nitrogen-mixture to be received by the NH3 source.

20. The method according to claim 16, wherein a main control unit of the system controls the generation of the NH3 to be stored in the NH3 storage vessel and/or the generation of energy with the NH3 power generator.

21. The method according to claim 20, wherein the main control unit controls the generation of the NH3 to be stored in the NH3 storage vessel and/or the generation of energy with the NH3 power generator at least depending on an actual power demand in the energy grid and/or on an amount of energy currently generated by the renewable energy source.

22. The method according to claim 20, wherein the main control unit
reduces the generation of the NH3 to be stored in the NH3 storage vessel and/or increases the generation of energy during periods of low renewable energy input from the renewable energy source, and
increases the generation of the NH3 to be stored in the NH3 storage vessel and/or reduces the generation of energy during periods of high renewable energy input from the renewable energy source.

23. A system for providing energy for an energy grid based on energy provided by a renewable energy source, comprising
an H2-N2-production unit for producing Hydrogen and Nitrogen, wherein the H2-N2-production unit is operated by using the energy provided by the renewable energy source,
a mixing unit configured to receive and mix the Hydrogen and the Nitrogen produced by the H2-N2-production unit to form a Hydrogen-Nitrogen-mixture,
an ammonia (NH3) source for receiving and processing the Hydrogen-Nitrogen-mixture for generating a gas mixture containing NH3, wherein the NH3 source comprises an NH3 storage vessel for storing at least a part of the NH3 of the gas mixture containing NH3,
an NH3 power generator for generating the energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid, a Hydrogen injection system (HIS) for extracting a Hydrogen portion from a stage of the system and for adding extracted Hydrogen to the gas stream to be provided to the NH3 power generator, wherein the Hydrogen injection system comprises a Hydrogen control system for controlling an HIS flow rate of Hydrogen from the Hydrogen injection system to the gas stream to be provided to the NH3 power generator, the HIS flow rate being determined in accordance with a data set which contains information about actual working conditions of the NH3 power generator, wherein the data set is received by the Hydrogen control system, wherein the NH3 source comprises:

an NH3 reaction chamber configured to receive the Hydrogen-Nitrogen-mixture from the mixing unit and to process the received Hydrogen-Nitrogen-mixture to form the gas mixture containing NH3, and a separator for receiving the gas mixture containing NH3 from the NH3 reaction chamber, wherein the separator is configured to separate NH3 from the gas mixture containing NH3 such that NH3 and a remaining Hydrogen-Nitrogen-mixture are produced, and wherein the separator is fluidly connected to the NH3 storage vessel to direct the produced NH3 to the NH3 storage vessel, the system for providing the energy for the energy grid based on energy provided by the renewable energy source further comprising:

a re-processing unit (RPU) for re-processing the remaining Hydrogen-Nitrogen-mixture with a re-compressor and an RPU mixer, wherein the re-compressor is fluidly connected to the separator to receive and compress the remaining Hydrogen-Nitrogen-mixture from the separator, wherein the RPU mixer is fluidly connected to the re-compressor to receive the compressed remaining Hydrogen-Nitrogen-mixture from the re-compressor, wherein the RPU mixer is fluidly connected to the mixing unit to receive the Hydrogen-Nitrogen-mixture from the mixing unit, and wherein the RPU mixer is configured to mix the Hydrogen-Nitrogen-mixture from the mixing unit and the compressed remaining Hydrogen-Nitrogen-mixture from the re-compressor to form the Hydrogen-Nitrogen-mixture to be provided to the NH3 source.

* * * * *